Dec. 24, 1940.  R. MAYER  2,226,251

POST BRACKET

Filed Aug. 7, 1939

INVENTOR
RICHARD MAYER
BY
ATTORNEY

Patented Dec. 24, 1940

2,226,251

UNITED STATES PATENT OFFICE 2,226,251

POST BRACKET

Richard Mayer, New Rochelle, N. Y., assignor to Masterbilt Products Corporation, New York, N. Y., a corporation of New York Application August 7, 1939, Serial No. 288,807

9 Claims. (Cl. 24—243)

This invention relates generally to brackets. More particularly, my invention relates to a certain new and useful improvement in brackets especially adapted for mounting a cigarette or other container upon a steering or other post and has for its primary object the provision of a bracket of the type and for the purpose stated which is simple in structure, which may be cheaply and economically manufactured, which is durable in construction, which may be easily and conveniently installed upon an automobile steering post or the like, which is readily adjustable for secure clamping engagement upon posts of varying shape and diametral size, and which is highly efficient in the performance of its stated functions.

And with the above and other objects in view, my invention resides in the novel features of form, construction, arrangement, and combination of parts presently described and pointed out in the claims.

In the accompanying drawing—

Figure 1:
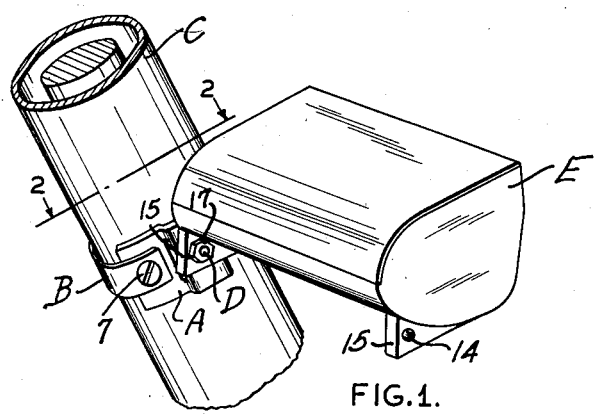
Figure 1 is a perspective view illustrating a post bracket of my invention in clamped or installed position for mounting a cigarette box upon an automotive steering-wheel post, the latter being fragmentally shown.

Referring now in more detail and by reference characters to the drawing, which illustrates a preferred embodiment of my invention, A designates the main or body section of the bracket, which is cast, stamped, or otherwise formed preferably of suitable metal and includes preferably integrally a rigid U-shaped or channel end-portion or so-called yoke $a$ and a rigid arcuate wing $b$, the yoke $a$ comprising a bight or web 1 centrally provided with an aperture, as at 2, and a pair of opposed laterally presented legs or flanges 3, 4, provided with registering elongated slots 5, 5, and the wing $b$ extending laterally outwardly from the outer margin of the leg or flange 3 and being provided at or adjacent its outer or free margin with a preferably threaded aperture 6 for receiving a tightening or clamping screw 7, as shown and for purposes presently fully appearing.

Having one end, as 8, disposed for slidable adjustment through the registering slots 5 and across the inner face of the bight or web 1 of the yoke $a$ and its other end, as 9, apertured as at 9' and detachably secured by the screw 7 to and upon the outer face of the wing $b$, is an annular band B constructed preferably of relatively thin strap metal or other suitable flexible material for loopwise encircling and clampwise engaging a steering post or the like C upon which the bracket is to be mounted.

In its end 8, the band or strap B is provided with an aperture, as at 10, of substantially the same diametral size as, and for registration with, the bight-aperture 2 of the yoke $a$ for transversely accommodating and snugly seating the shank 11 of a container mounting-member or stud D formed or provided preferably integrally at its one or inner end with a preferably out-of-round or rectangular head 12 for snugly fitting between, and for engagement by, the flanges or legs 3, 4, of the yoke $a$ for securely retaining the stud D from rotative movement.

At its opposite end, the shank 11 of the stud D is first formed with a diametrally enlarged serrated section 13 for non-rotative engagement in an aperture 14 formed in one of the mounting-lugs 15 of a cigarette box or other container E and is then along its outer or free extremity threaded, as at 16, for receiving an attachment nut or the like 17 by which the box or container E may be firmly secured in place.

Figure 2:
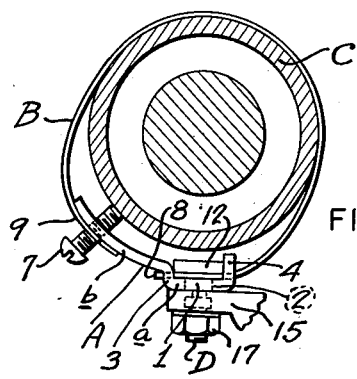
Figure 2 is an end view of the bracket, taken approximately along the line 2—2, Figure 1.
Figure 3:
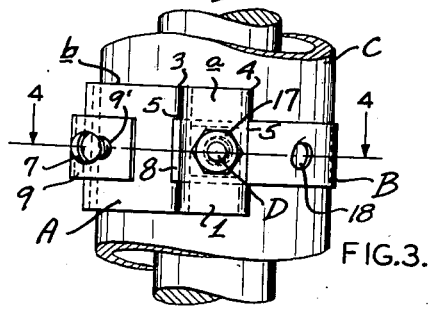
Figure 3 is an elevational view of the bracket in installed position upon a steering post, as in Figure 1.
Figure 4:
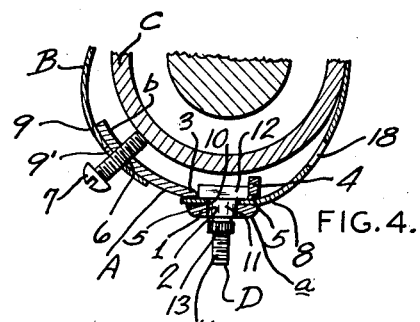
Figure 4 is a fragmentary sectional view of the bracket, taken approximately along the line 4—4, Figure 3.

For purposes presently appearing, the strap B is further provided with a second aperture, as at 18, of substantially the same size as the end aperture 10 and spaced outwardly along the strap B preferably by a distance substantially equal to the distance between the centers of the apertures 2 and 6 of the yoke $a$ and wing $b$, all as best seen in Figures 2 and 4 and for purposes presently appearing.

In use and practice, for example, the nut 17 is loosened and the box or other container E adjusted to approximately the desired angle. The tightening-screw 7 is thereupon removed, and the strap or band B at its end 9 suitably flexed and looped about the particular post C. The strap-end 9 is thereupon again brought into facewise abutment over the outer face of the wing $b$ and the screw 7 re-inserted into the wing aperture 6. The band B and attached container E may then be shifted circumferentially about the steering post C to the desired position, and the screw 7 threaded inwardly into endwise impingement against the post C, the strap B being thereby tightly drawn around the post C and the band or strap B and mounted container E firmly clampwise secured to and upon the post C, substantially as shown in Figure 2. The nut 17 may thereupon be loosened and the box or container E readjusted, if required, to the precise angle desired, the nut 17 being again tightened up and the box or container E being secured in the desired position for convenient access to its contents.

Figure 5:
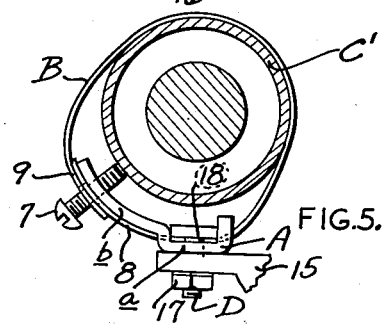
Figure 5 is an end view of the bracket adjusted for, and in clamped engagement with, an automotive steering post of reduced diametral size.

In the event a particular steering or other post, as, for instance, post C', Figure 5, is of such reduced diameter that the amount of adjustment permitted by the radial movement of the tightening screw 7 is insufficient to hold the bracket securely in place, then the nut 17 and the box or container E may be taken off and the stud D removed from the member A. The end 8 of the strap B may then be adjustably shifted through the registering slots 5 of the yoke a until the auxiliary or supplemental aperture 18 provided for the purpose in the band-end 8 is in registration with the bight-aperture 2. At the same time, the tightening-screw 7 may be removed and the strap-end 9 flexed outwardly, as previously described. Under such conditions, the strap aperture 10 will now be in more or less concentric alignment with the wing aperture 6 and the aperture 9' of the opposed strap-end 9. The stud D may thereupon be re-inserted through the strap aperture 18 and the yoke aperture 2 and the box or container E mounted upon the extended end of the stud D, substantially in the manner described, thus substantially reducing the over-all diametral size of the clamp A.

With the free end of the strap B bent outwardly for clearance, the bracket may be slipped around a small size post C' and the strap-end 9 then brought around into overlying facewise abutment upon the outer face of the other strap-end 8 and the screw 7 now disposed through the registering apertures 9' and 10 and into bracket-securing engagement with the wing b, substantially as previously described.

The bracket may be cheaply manufactured, is durable and compact, may be readily and easily installed, is efficient in the performance of its intended functions, and is so uniquely constructed that, as will be evident, installation may be conveniently made upon a column that is in close proximity to any interfering surface.

It should be understood that changes and modifications in the form, construction, arrangement, and combination of the several parts of the bracket may be made and substituted for those herein shown and described without departing from the nature and principle of my invention.

Having thus described my invention, what I claim and desire to secure by Letters Patent is—

1. A post-bracket including, in combination, a body-member comprising a yoke having spaced legs apertured in registration, a post-encircling strap, and means for securing the body-member to and upon the strap, the strap having an end-portion projecting endwise through said leg apertures.

2. A post-bracket including, in combination, a body-member comprising a yoke having spaced legs slotted in registration, a post-encircling strap having an end-portion projecting endwise through said leg slots, and a stud having engagement with said strap-end and the yoke for mounting a container on the body-member.

3. A post-bracket including, in combination, a body-member comprising a yoke approximately of U-shape in cross-section having an aperture in its bight and its legs being slotted in registration, a post-encircling strap having an end-portion projecting endwise through the slots of said legs, a container-mounting member projecting through said strap end-portion and said bight-aperture, and means for securing the other end-portion of the strap to the body-member.

4. A post-bracket including, in combination, a body-member comprising a yoke approximately of U-shape in cross-section having an aperture in its bight and its legs being slotted in registration, a post-encircling strap having an end-portion projecting endwise through said leg slots and having an aperture for registration with said bight-aperture, and a container-mounting member projecting through said registering bight and strap-apertures and engaged by the body-member.

5. A post-bracket including, in combination, a body-member comprising a yoke approximately of U-shape in cross-section having an aperture in its bight and its legs being slotted in registration, a post-encircling strap having an end-portion projecting endwise through said leg slots and having apertures in its opposed end-portions adapted for registration when the strap is in post-encircling engagement, and means engaging the strap at said apertures and the body-member for securing the body-member to and upon the strap.

6. A post-bracket including, in combination, a body-member comprising a yoke approximately of U-shape in cross-section and an arcuate wing projecting laterally from a leg of the yoke, the yoke having an aperture in its bight and slots in its legs, said slots being in registration, a post-encircling strap having an end-portion projecting endwise through said leg-slots, a member engaging the wing and the opposite strap-end portions for securing the strap clampwise upon a post and the body-member to and upon the strap, and a container-mounting member projecting through the strap and bight-aperture and engaged by the legs of the yoke.

7. A post-bracket including, in combination, a body-member comprising a yoke approximately of U-shape in cross-section and an arcuate wing projecting laterally from a leg of the yoke, the legs of the yoke being slotted in registration, a post-encircling strap having an end-portion projecting endwise through said leg-slots, and a member engaging the wing and the strap-end portions for securing the strap clampwise upon a post and the body-member to and upon the strap.

8. A post-bracket including, in combination, a body-member comprising a yoke approximately of U-shape in cross-section and an arcuate wing projecting laterally from a leg of the yoke, the yoke having an aperture in its bight and slots in its legs and the leg-slots being in registration, a post-encircling strap having an end portion projecting endwise through said leg-apertures, a member projecting through the bight-aperture and engaging the yoke and strap end-portion for both securing the strap at said end-portion to the body-member and mounting a container thereon, and a second member engaging the wing and opposed strap end-portion for securing the strap clampwise upon a post.

9. A post-bracket including, in combination, a body-member comprising a yoke having spaced legs apertured in registration, a post-encircling strap, means for securing the body-member to and upon the strap, the strap having an end-portion projecting endwise through said leg apertures, and a wing extending outwardly from one of the yoke-legs and being provided with means for securing the other end of the strap to the wing and imposing clampwise pressure upon the post.

RICHARD MAYER.